(12) United States Patent
Throop et al.

(10) Patent No.: US 8,745,327 B1
(45) Date of Patent: Jun. 3, 2014

(54) METHODS, SYSTEMS, AND COMPUTER READABLE MEDIUM FOR CONTROLLING PRIORITIZATION OF TIERING AND SPIN DOWN FEATURES IN A DATA STORAGE SYSTEM

(75) Inventors: Dean D. Throop, Efland, NC (US); Dennis Duprey, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 400 days.

(21) Appl. No.: 13/168,329

(22) Filed: Jun. 24, 2011

(51) Int. Cl.
*G06F 12/00* (2006.01)

(52) U.S. Cl.
USPC .......................... 711/114; 711/100; 711/165

(58) Field of Classification Search
USPC .......................... 711/100, 114, 165
See application file for complete search history.

(56) References Cited

U.S. PATENT DOCUMENTS

| | | | |
|---|---|---|---|
| 5,604,902 | A | 2/1997 | Burkes et al. |
| 6,681,242 | B1 | 1/2004 | Kumar et al. |
| 6,880,062 | B1 | 4/2005 | Ibrahim et al. |
| 7,284,244 | B1 | 10/2007 | Sankaranarayan et al. |
| 7,340,522 | B1 | 3/2008 | Basu et al. |
| 7,406,484 | B1 | 7/2008 | Srinivasan et al. |
| 7,463,648 | B1 | 12/2008 | Eppstein et al. |
| 7,480,912 | B2 | 1/2009 | Arnold et al. |
| 7,849,180 | B2 | 12/2010 | Sawyer et al. |
| 8,140,821 | B1 | 3/2012 | Raizen et al. |
| 8,191,125 | B2 * | 5/2012 | Dellow et al. ................ 726/7 |
| 8,407,445 | B1 | 3/2013 | Pathak et al. |
| 8,443,163 | B1 | 5/2013 | Bailey et al. |
| 8,443,369 | B1 | 5/2013 | Bailey et al. |
| 8,473,678 | B1 | 6/2013 | Rajasekaran et al. |
| 2001/0049779 | A1 | 12/2001 | Shimada et al. |
| 2003/0056073 | A1 | 3/2003 | Zeiger |
| 2003/0131165 | A1 | 7/2003 | Asano et al. |
| 2004/0039891 | A1 | 2/2004 | Leung et al. |
| 2004/0098537 | A1 | 5/2004 | Serizawa |
| 2004/0153606 | A1 | 8/2004 | Schott |
| 2004/0181476 | A1 | 9/2004 | Smith et al. |
| 2004/0243699 | A1 | 12/2004 | Koclanes et al. |
| 2005/0193231 | A1 | 9/2005 | Scheuren |
| 2005/0273556 | A1 | 12/2005 | Gellai et al. |
| 2006/0085471 | A1 | 4/2006 | Rajan et al. |
| 2006/0112247 | A1 | 5/2006 | Ramany et al. |
| 2006/0143424 | A1 | 6/2006 | Matsuzaki |
| 2007/0043842 | A1 | 2/2007 | Chouanard et al. |
| 2007/0143563 | A1 | 6/2007 | Pudipeddi et al. |
| 2007/0185934 | A1 | 8/2007 | Cannon et al. |
| 2008/0082593 | A1 | 4/2008 | Komarov et al. |
| 2009/0034107 | A1 * | 2/2009 | Posamentier .................. 360/15 |

(Continued)

OTHER PUBLICATIONS

Official Action for U.S. Appl. No. 12/164,959 (Sep. 12, 2011).

(Continued)

*Primary Examiner* — Jasmine Song
(74) *Attorney, Agent, or Firm* — Jenkins, Wilson, Taylor & Hunt, P.A.

(57) ABSTRACT

According to one aspect, the subject matter described herein includes a method for controlling prioritization of tiering and spin down features in a data storage system. The method is performed at a data storage array comprising a plurality of physical data storage disks for storing data and includes identifying data that is infrequently accessed. The infrequently accessed data is relocated to a subset of the physical data storage disks designated for storing infrequently accessed data and the spin rate of the subset of the disks is reduced.

23 Claims, 3 Drawing Sheets

(56) References Cited

U.S. PATENT DOCUMENTS

| | | |
|---|---|---|
| 2009/0064159 A1 | 3/2009 | LaFrese et al. |
| 2009/0077327 A1 | 3/2009 | Hara |
| 2009/0089516 A1 | 4/2009 | Pelts et al. |
| 2009/0276588 A1 | 11/2009 | Murase |
| 2010/0153641 A1 | 6/2010 | Jagadish et al. |
| 2010/0262802 A1 | 10/2010 | Goebel et al. |
| 2010/0299495 A1 | 11/2010 | Frank |
| 2011/0145609 A1* | 6/2011 | Berard et al. ............... 713/320 |
| 2011/0191536 A1 | 8/2011 | Mizuno et al. |

OTHER PUBLICATIONS

Final Official Action for U.S. Appl. No. 12/100,514 (May 25, 2011).
Non-Final Official Action for U.S. Appl. No. 12/100,514 (Nov. 16, 2010).
Commonly-assigned, Co-pending U.S. Appl. No. 12/826,434 for "Managing Multi-Tiered Storage Pool Provisioning," (Unpublished, filed Jun. 29, 2010).
Commonly Assigned, Co-pending U.S. Appl. No. 12/826,385 for "Systems, Methods, and Computer Readable Media for Compressing Data at a Virtually Provisioned Storage Entity" (Unpublished, filed Jun. 29, 2010).
Commonly Assigned, Co-pending U.S. Appl. No. 12/824,816 for "Methods, Systems, and Computer Readable Medium for Tier-Based Data Storage Resource Allocation and Data Relocation in a Data Storage Array" (Unpublished, filed Jun. 28, 2010).
Commonly Assigned, Co-pending U.S. Appl. No. 12/751,685 for "Systems, Methods, and Computer Readable Media for an Adaptive Block Allocation Mechanism" (Unpublished, filed Mar. 31, 2010).
Commonly Assigned, Co-pending U.S. Appl. No. 12/164,959 for "Methods, Systems, and Computer Readable Medium for Dynamic, Policy-Based Allocation of System Resources" (Unpublished, filed Jun. 30, 2008).
Commonly Assigned, Co-pending U.S. Appl. No. 12/100,514 for "Methods, Systems, and Computer Readable Medium for Allocating Physical Storage in a Storage Array" (Unpublished, filed Apr. 10, 2008).
Non-Final Official Action for U.S. Appl. No. 12/164,959 (Jul. 24, 2012).
Final Official Action for U.S. Appl. No. 12/751,685 (Jun. 27, 2012).
Applicant-Initiated Interview Summary for U.S. Appl. No. 12/100,514 (Jun. 5, 2012).
Non-Final Official Action for U.S. Appl. No. 12/751,665 (May 8, 2012).
Non-Final Official Action for U.S. Appl. No. 12/751,685 (Feb. 14, 2012).
Non-Final Official Action for U.S. Appl. No. 12/100,514 (Jan. 31, 2012).
Non-Final Office Action for U.S. Appl. No. 12/100,514 (Oct. 15, 2013).
Final Office Action for U.S. Appl. No. 12/826,385 (Sep. 10, 2013).
Notice of Allowance and Fee(s) Due for U.S. Appl. No. 12/826,434 (Mar. 7, 2013).
Non-Final Office Action for U.S. Appl. No. 12/826,385 (Mar. 5, 2013).
Interview Summary for U.S. Appl. No. 12/826,385 (Mar. 1, 2013).
Notice of Allowance and Fee(s) Due for U.S. Appl. No. 12/824,816 (Jan. 17, 2013).
Notice of Allowance and Fee(s) Due for U.S. Appl. No. 12/164,959 (Jan. 11, 2013).
Notice of Allowance and Fee(s) Due for U.S. Appl. No. 12/751,665 (Nov. 16, 2012).
Non-Final Official Action for U.S. Appl. No. 12/824,816 (Sep. 14, 2012).
Interview Summary for U.S. Appl. No. 12/751,665 (Aug. 20, 2012).
Final Official Action for U.S. Appl. No. 12/100,514 (Aug. 10, 2012).
Non-Final Official Action for U.S. Appl. No. 12/826,434 (Jun. 13, 2012).

* cited by examiner

METHODS, SYSTEMS, AND COMPUTER READABLE MEDIUM FOR CONTROLLING PRIORITIZATION OF TIERING AND SPIN DOWN FEATURES IN A DATA STORAGE SYSTEM

TECHNICAL FIELD

The subject matter described herein relates to data storage systems. More particularly, the subject matter described herein relates to methods, systems, and computer readable medium for controlling prioritization of tiering and spin down features in a data storage system.

BACKGROUND

A data storage array (herein also referred to as a "disk storage array", "disk array", or simply an "array") is a collection of physical data storage devices such as hard disk drives (also referred to simply as "disks" or "drives") operating together logically as a unified storage device designed to store large quantities of data. Storage arrays typically include one or more storage array processors (SPs), for handling input/output (I/O) requests and management type requests. An SP is the controller for and primary interface to the storage array.

Storage systems may include one or more disk arrays. Disk arrays may use a variety of storage devices with various characteristics for providing storage. Each storage array may logically operate as a unified storage device. While such organization generally allows for a homogenous view of the storage devices, it is sometime useful to organize the various storage devices into tiers or classes of storage. A tier is generally delineated by differences in at least one of the four following attributes: price, performance, capacity and function. For example, tier 1 storage devices may be comprised of storage media that is very fast, such as solid state (e.g., flash) memory. Tier 2 storage devices may be comprised of storage media that are slower than tier 1 media (e.g., hard disks). For example, tier 2 storage devices may include high performance disks such as 15,000 RPM serial attached SCSI (SAS) or Fibre Channel (FC) disks. Tier 3 storage devices may be comprised of comparatively slower and cheaper storage media than either tier 1 or tier 2, such as 7,200 RPM serial ATA (SATA) disks.

Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or volumes.

One factor that may limit the performance of a storage array is the performance of each individual storage component. For example, the read access time of a disk storage array may be constrained by the access time of the disk drive from which the data is being read. Read access time of a drive may be affected by physical characteristics of the disk drive including the number of revolutions per minute of the spindle: the faster the spin, the less time it takes for the sector being read to come around to the read/write head.

A large data storage array is an illustrative example. A data storage array may be thought of as a system for managing a large amount of a resource such as disk sectors. Management of the resource may include allocation of a portion of the resource in response to allocation requests or relocation of previously allocated resources. In the storage array example, portions of the storage array may be allocated to (e.g., exclusively used by) entities that request such allocation. One issue that may be considered by a SP executing a policy for determining where to store data within the array (e.g., a slice allocation or relocation policy) is how to balance between performance and power consumption of the array.

One capability in some individual disk drives that reduces power consumption is spin down capability. A drive with spin down capability allows power to be shut off from the motor that spins the disk, resulting in power savings. Other types of drives allow disks to be spun at reduced spin rates during periods of low activity. Managing performance, tiering, spin down, and reduced spin rate capability of a data storage array is desirable.

Accordingly, there exists a need for methods, systems, and computer readable medium for controlling prioritization of tiering and spin down features in a data storage system.

SUMMARY

According to one aspect, the subject matter described herein includes a method for controlling prioritization of tiering and spin down features in a data storage system. The method is performed at a data storage array comprising a plurality of physical data storage disks for storing data and includes identifying data that is infrequently accessed. The infrequently accessed data is relocated to a subset of the physical data storage disks designated for storing infrequently accessed data and the spin rate of the subset of the disks is reduced.

According to another aspect, the subject matter described herein includes a system controlling prioritization of tiering and spin down features in a data storage system. The data storage array includes a plurality of physical data storage disk drives for storing data. The data storage array further includes a slice manager for identifying data that is infrequently accessed, relocating the infrequently accessed data to a subset of the physical data storage disks designated for storing infrequently accessed data, and reducing the spin rate of the subset of the disks.

The subject matter described herein for controlling prioritization of tiering and spin down features in a data storage system may be implemented in hardware, software, firmware, or any combination thereof. As such, the terms "function" or "module" as used herein refer to software in combination with hardware and/or firmware for implementing the feature being described. In one exemplary implementation, the subject matter described herein may be implemented using a non-transitory computer readable medium having stored thereon computer executable instructions that when executed by the processor of a computer perform steps.

Exemplary non-transitory computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

Terminology

As used herein, a "resource" is a physical or logical resource of the system to be managed, and a "resource object" is a data construct or other abstraction used to represent a specific instance of a resource. Examples of physical resources include processors, buses, memories or portions of memories, storage entities or portions thereof. Examples of logical resources include accounts, users, quotas, permissions, access control lists, account balances, and timeslots.

As used herein, a "resource collection" or "collection" is a set of resources of the same type, and a "collection object" is a data construct or other abstraction used to represent the collection. A collection object may include or point to a set of resource objects. A collection object may export interfaces to add, remove, search, and enumerate resource objects.

As used herein, an "interface" is a predefined mechanism by which certain functions or tasks are performed. For example, an interface may be a function, subroutine, class method, and the like. The interface abstraction is used so that the underlying manner of manipulating the objects is hidden from the entity that uses the interface, e.g., invokes the function or method. This gives flexibility, allowing a change of how the objects are stored, e.g., lists, hash tables, b-trees, etc., without any external changes.

As used herein, a "logical unit" or "LU" is a logical partition of data stored on a physical disk device.

As used herein, a "thin logical unit" or "TLU" is a sparsely populated LU provisioned at creation but which is not allocated any storage until the storage is actually needed.

As used herein, a "fully allocated logical unit" or "FLU" is a fully allocated LU which is created by provisioning and allocating a certain amount of storage.

As used herein, a "direct logical unit" or "DLU" is a fully provisioned mapped LU with coarse mapping. Even though a DLU is seen as fully provisioned by a user, internally storage space is allocated on as needed basis.

As used herein, a "mapped logical unit" or "MLU" is a mapped LU, i.e., a LU managed by the MLU driver, i.e., a TLU or DLU.

As used herein, a "slice" is a portion of an LU.

As used herein, a "resource pool" or "pool" is some amount of storage for mapped LUs.

As used herein, a "tier" is a collection of storage of similar performance. Exemplary performance buckets may include "high performance," "medium performance," and "low performance."

As used herein, a "performance bucket" is a higher level resource grouping or abstraction which is logically located above all other existing resource groups managed by the slice manager (e.g., RG, Bus, etc.). While a performance bucket may correspond to a coarse tier, this need not always be the case. Exemplary performance buckets may include "high performance," "medium performance," and "low performance."

As used herein, a "fine tier" is an internal (not user-visible) tier indicative of expected performance of that tier.

As used herein, a "coarse tier" is an external (user-visible) tier that aggregates the expected performance of one or more fine tiers.

As used herein, a "tier descriptor" is value associated with a FLU which identifies a fine tier and embodies two properties: the index for the coarse tier to which the fine tier belongs, and the performance estimate for the fine tier.

As used herein, a "fine tier value" is an internal performance value very specific to a particular LU which could be derived based on the disk type, disk consumption, revolutions per minute (RPM), etc.

As used herein, a "coarse tier value" is a user visible performance value and this will be the aggregation of similarly performing LUs.

As used herein, a "request" is a slice manager policy requesting that a slice manager use its best effort to satisfy one or more constraints but will not fail if there are other available slices.

As used herein, a "requirement" is a slice manger policy requiring that a slice satisfy one or more constraints and will fail even if other slices are available but do not meet the policy.

As used herein, an "allocation" is to set apart for a special purpose; designate, distribute according to a plan; allot a certain amount of storage space in a pool.

As used herein, a "reservation" is a process of locking a certain amount of storage space in a pool.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Energy consumption is a major concern in data storage systems, where a significant portion of the energy consumed is by the disk drives, especially the motors that spin the physical disks. In data storage systems, I/O requests for data may be not evenly distributed and some data may be frequently accessed (hereinafter, "hot" data) and some data may be infrequently accessed (hereinafter, "cold" data). Modern disk drives typically have several power modes: active, idle, standby, and sleep, each respectively utilizing less power, that allow disks to be spun down during idle time to save energy. In the active mode, a disk is actively seeking, writing or reading with the platters are spinning at full speed. In the idle mode, the platters remain spinning but the read/write electronics are off and the disk head may be parked. In the standby mode, the platters are not rotating. The sleep mode shuts off all remaining electronics. Switching between levels requires some energy as well as time depending on the transition. The switch between active and idle is almost instantaneous with little energy expense; accordingly, the disk can immediately switch between the idle and active modes. Therefore, the active and idle modes may be used interchangeably throughout with respect to energy consumption (i.e., maximum or hot). In addition, it may be appreciated that many conventional power management policies implemented by the disk controller assume only two power states: a working state (e.g., the active/idle state) and a low power state (e.g., the standby state or the sleep state). Accordingly, for simplicity of discussion, the same assumption is used below. However, this is not intended to be limiting and power management policies having more than two power states may be implemented without departing from the scope of the subject matter described herein.

The standby mode consumes less power over time; however, to serve a request, a disk must return to the active mode which requires both time and energy. The transition to standby mode is referred to as "spin down" and the return to active mode as "spin up." A disk must remain in standby mode for a period of time, the "break-even" time, to compensate for the additional energy expense. The break-even time for a disk drive depends on its operational parameters. As mentioned before, the disk requires extra energy and time to spin down and then spin up. For a particular disk, there is a period during which it costs the same amount of energy to keep the disk in the idle mode or to spin the disk down, stay in the standby mode and then spin it up (i.e., the break-even time). Furthermore, disk activities can be viewed as a sequence of disk accesses, each of which is represented by its access time. The time period between two successive accesses may be hereinafter referred to as an idle interval.

Figure 1A:
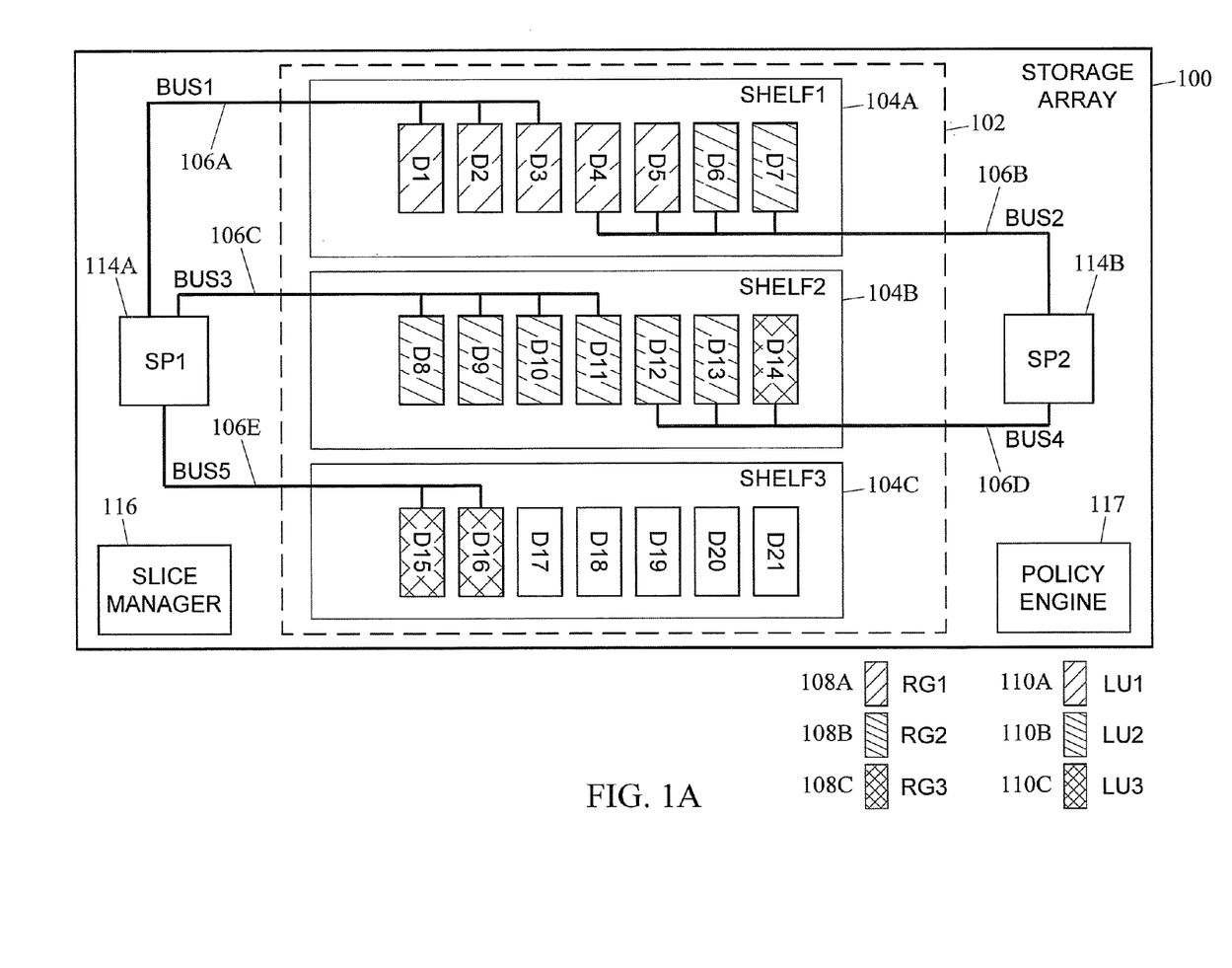
FIG. 1A is a block diagram illustrating an exemplary data storage array for tier-based slice allocation and data relocation in a data storage array according to an embodiment of the subject matter described herein.

FIG. 1A is a block diagram of an exemplary data storage array for tier-based slice allocation and data relocation in a data storage array according to an embodiment of the subject matter described herein. It may be appreciated that while the embodiment illustrated in FIG. 1A includes a data storage array, management of other systems or system resources may be used for implementing tier-based slice allocation and data relocation in a data storage array without departing from the scope of the subject matter described herein. Additionally, although the atomic unit of resource being allocated may be, for example, a single disk sector; a storage array may be organized into a hierarchical set of collections. For example, disks may be logically and/or electrically divided into "disks that are connected to one bus" and "disks that are connected to another bus"; disks may be grouped into RAID (redundant array of inexpensive disks) groups; RAID groups may be divided into logical units, or LUs; LUs may be subdivided into portions hereinafter referred to as "slices"; slices may be subdivided also, and so on. If the system is designed such that each disk is connected to only one bus; and each bus may be managed by a separate storage processor. For example, the natural boundary of physical connection to one bus or another may dictate that the organizational structure of a RAID group be constrained to one bus, e.g., that a RAID group cannot span multiple buses. The organizational structure of an LU may be similarly constrained, e.g., an LU cannot span multiple RAID groups. In this example, the high level abstraction of a RAID group allows a collection of individual disks to be treated as a single, large disk, an abstraction that simplifies management of that collection of disks.

Referring to FIG. 1A, storage array 100 may include multiple storage devices 102, which are hard disk drives such as serial attached SCSI (SAS) drives, FibreChannel Drives, serial advanced technology attachment (SATA) drives, or some combination of the above. In one embodiment, storage devices 102 may be organized into multiple shelves 104, each shelf containing multiple storage devices 102. In the embodiment illustrated in FIG. 1, storage array 100 includes three shelves, Shelf1 104A, Shelf2 104B, and Shelf2 104CB. Shelves 104A-104C each contain seven storage devices, D1-D21. In one embodiment, each storage device 102 may be connected to one or more buses 106. In the embodiment illustrated in FIG. 1A, each shelf 104 has two buses 106, at least one of which connects to every device 102 on each shelf 104. For example, Shelf1 104A has two buses, Bus1 106A and Bus2 106B, where Bus1 106A is connected to devices D1-D3 and Bus2 106B is connected to devices D4-D7. Similarly, Shelf2 104B has two buses, Bus3 106C and Bus4 106D, where Bus2 106C is connected to devices D8-D11 and Bus3 106D is connected to devices D12-D14. Lastly, Shelf3 104C has one bus, Bus5 106E, where Bus5 106E is connected to devices D15-D16. Remaining storage devices D17-D21 are not shown connected to any busses or associated with any RAID group for simplicity purposes only. It may be appreciated that the configuration of storage array 100 as illustrated in FIG. 1 is for illustrative purposes only and is not to be considered a limitation of the subject matter described herein.

In addition to the physical configuration, storage devices 102 may also be logically configured. For example, multiple storage devices 102 may be organized into redundant array of inexpensive disks (RAID) groups, or RGs 108, shown in FIG. 1A being differently shaded as RG1 108A, RG2 108B, and RG3 108C. Storage devices D1-D5 are shown organized into a first RAID group, RG1 108A, while storage devices D6-D13 are organized into a second RAID group, RG2 108B, and storage devices D14-D16 are organized into a third RAID group, RG3 108C. In one embodiment, a RAID group may span multiple shelves and/or multiple buses. Although RAID groups are composed of multiple storage devices, a RAID group may be conceptually treated as if it were a single storage device.

Storage devices 102 may be managed by one or more storage processors 114. Storage processors (SPs) 114 may be responsible for allocating storage and maintaining information about how that allocated storage is being used. Storage processors 114 may maintain information about the structure of the file system whose contents are being stored in the allocated slices. For example, SP1 114A may be connected to bus1 106A, bus3 106C, and bus5 106E for managing disks D1-D3, D8-D11, and D15-D16. Similarly, SP2 114B may be connected to bus2 106B, and bus4 106D for managing disks D41-D7, and D12-D14. It may be appreciated that multiple SPs can manage all disks/buses at the same time but may coordinate with each other.

In one implementation of storage array 100, each logical unit 110 may be associated with a slice allocation table (SAT), which is used to record information about each slice 112, such as the MLU that is using the slice 112 and whether the slice is free or allocated. The SAT may be stored in the logical unit 110, or it may be stored outside the logical unit 110 to which it is associated. Additional details regarding slice relocation and tiered data storage arrays are disclosed in U.S. patent application Ser. No. 12/826,434 filed on Jun. 29, 2010 and entitled, "MANAGING MULTI-TIERED STORAGE POOL PROVISIONING" and U.S. patent application Ser. No. 12/824,816 filed on Jun. 28, 2010 and entitled, "METHODS, SYSTEMS, AND COMPUTER READABLE MEDIUM FOR TIER-BASED DATA STORAGE RESOURCE ALLOCATION AND DATA RELOCATION IN A DATA STORAGE ARRAY" which are incorporated by reference herein in their entireties.

Figure 1B:
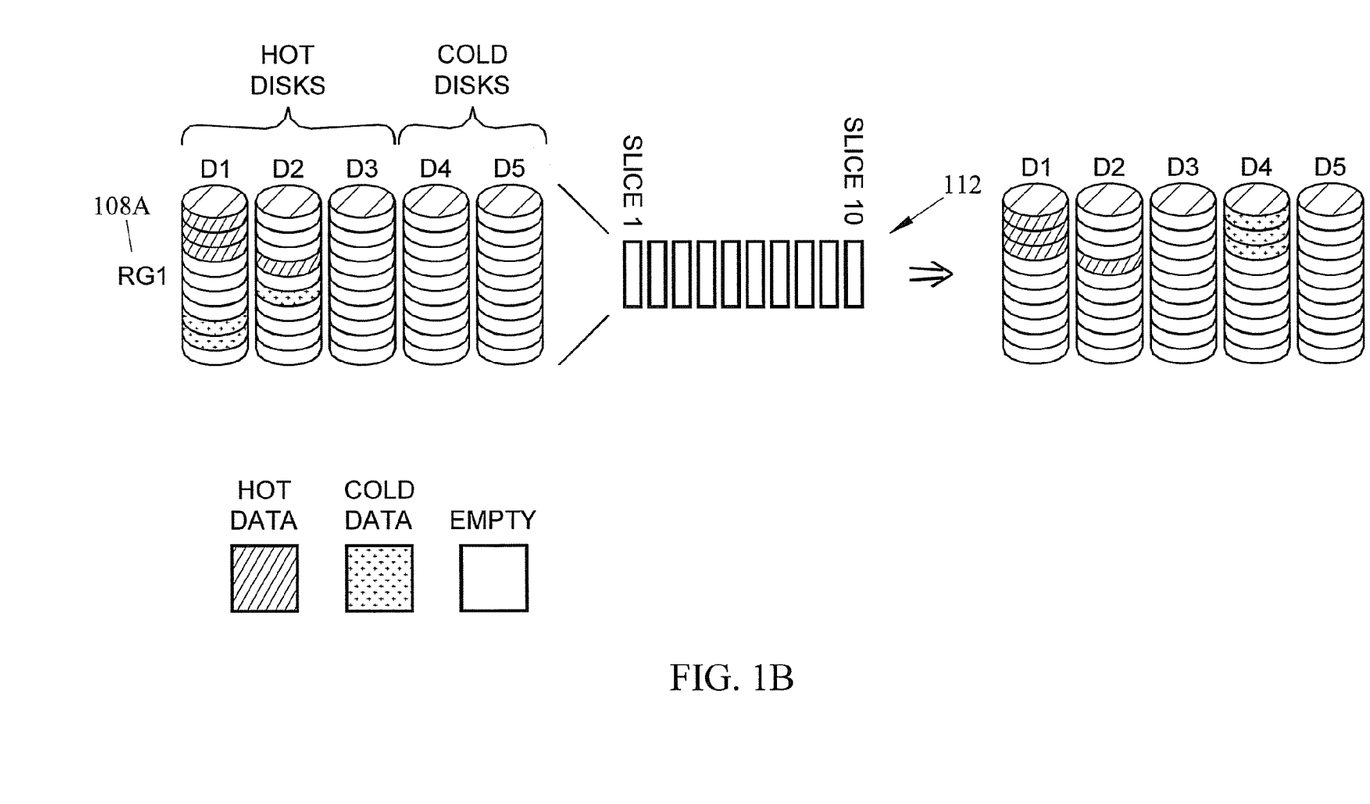
FIG. 1B is a diagram of an exemplary scenario for relocating data from hot disks to cold disks illustrating controlling prioritization of tiering and spin down features in a data storage system according to an embodiment of the subject matter described herein.

FIG. 1B is a diagram of an exemplary scenario for relocating data from hot disks to cold disks illustrating controlling prioritization of tiering and spin down features in a data storage system according to an embodiment of the subject matter described herein. For example, storage entities 102 described above, which may refer to a RAID group operating as a single storage device, may be further sub-divided into logical units. A single RAID group may contain one or more logical units (LUs) 110. In the embodiment illustrated in FIG. 1B, RAID groups 108 also correspond to LUs 110. For example, RG1 108A may correspond to LU L1 110A, RG2 108B may correspond to LU L2 110B, and RG3 108C may correspond to LU L3 110C. It may be appreciated, however, that RAID groups need not correspond to LUs and that RAID groupings may be further divided into two or more LUs without departing from the scope of the subject matter described herein.

In addition to RAID groups, each logical unit 110 may be further subdivided into portions of a logical unit, referred to as "slices" 112. In the embodiment illustrated in FIG. 2, RG1 108A/LU1 110A is shown divided into ten slices 112, SLICE1-SLICE10. Slices 112 may be allocated, de-allocated, re-allocated, reserved, or relocated by slice manger 116.

Slice manager 116 may be a software application or layer that is executed, at least in part, by one or more SPs 114. Slice manager 116 may be responsible for implementing a slice allocation policy and/or algorithm. For example, slice manager 116 may receive slice allocation requests, service slice allocation requests, and maintain relevant statistical information regarding slices.

According to one embodiment, the subject matter described herein provides for using the slice relocation mechanism of slice manager 116 to move slices with cold data onto drives and slow the rotational speed or cease rotation of the drives in order to conserve power. It may be appreciated that storing data across multiple disk drives in an array allows for data to be read from the drives in parallel, increasing I\O performance. Conversely, spinning down as many drives in the array as possible into their low-power states may be beneficial in terms of power savings. Therefore, the subject matter described herein may be viewed as a tradeoff between spreading the data across all available spindles for better performance versus concentrating the slices on a fewer drives to enable greater power savings by spinning down the drives.

According to an additional aspect, slices or LUs may be designated as eligible for spin down or not eligible for spin down using a configuration parameter associated with each slice or LU. Because some applications may not tolerate the significant latency incurred by spin up, it may be important to exempt certain slices or LUs from being stored on a disk that is to be spun down via this designation. Thus, in the embodiment where one or more drives are spun down (e.g., turned off), only slices from LUs which are enabled for spin down or unallocated (free) slices are stored on cold drives so that only slices belonging to LUs marked as being able to tolerate the spin up latency reside on drives to be spun down. For example, the SAT may include a configurable parameter for indicating whether a particular LU may be eligible for spin down. This parameter may be set, or requested to be set, by a customer whose data is stored in the LU and may allow the customer to override any policy decisions made by the administrator of the array that relate to data relocation policies that would result in spinning down the customer's data. For example, a first customer may store data on array 100 which, based on the thresholds or other criteria described herein, would classify the data as being cold and therefore eligible for being relocated to a cold disk and spun down. The first customer may use this data in conjunction with a first application that is not performance sensitive and, as a result, the first customer may set the spin down attribute associated with the LU as being eligible for spin down. On the other hand, a second customer may have a second, separate LU (whether stored on the same disk/RG as the first customer or not) that is associated with a second application that is highly performance sensitive. Because the second customer may not wish to suffer the spin down/spin up performance penalty (e.g., as much as 2-3 minutes), the second customer may indicate using the spin down attribute associated with the second LU that it is not eligible for spin down/relocation policies.

According to another embodiment, cold data may be relocated to/stored on a designated subset of drives (i.e., cold disks) and those drives may be instructed to reduce their rotational speed or cease rotation in order to conserve power. This may be contrasted with the above-described embodiments where only active and standby modes are assumed. Instead, there may be a continuum of spin rates that may be used. For example, a cold disk may immediately return to its minimum spin rate (e.g., zero or off) or may slowly reduce its spin rate as time passes and the cold data remains unaccessed (e.g., remains cold or gets colder). For a disk having a 7,200 rpm nominal rate, the disk may be configured to reduce its spin rate to 5,000 rpm after 5 minutes without further data access requests, and then again to 1,000 rpm after 1 hour without further data access requests, and so on. This may be accomplished, for example, by sending instructions to the disk controller to lower the spin rate of the drive.

In addition to the two states mentioned above (hot/cold) for data, data may be associated with a value used as input to a policy manager for determining where the data should be stored and whether it should be spun down. This value may be hereinafter referred to as the "temperature" of the data and may indicate how often the data is accessed. Thus, different data may have different temperatures from hot, hotter, hottest or from cold, colder, coldest and anything in between. Alternatively, data temperature may be indicated using an arbitrary metric such as 0 degrees to 100 degrees and power-versus-performance management policies may use this metric for determining whether data should be relocated to particular drives. For example, an administrator may set a policy such that data colder than 50 degrees should be relocated onto cold drives or the administrator may set a policy such that only data colder than 20 degrees should be relocated onto cold drives. It should also be appreciated that data temperature may decay over time such that a single or burst I/O request for a particular piece of data may raise the temperate only slightly. If the data continues to be requested, the temperature may continue to rise or, conversely, if no further I/O requests for the data are observed the temperature of the data may drop over time.

Referring to the exemplary slice relocation scenario shown in FIG. 1B, data may be stored on slices 1-3 and 8-9 of disk drive D1 and on slices 4 and 6 of disk drives D2. Based on frequency of access, it may be determined that slices 1-3 of D1 and slice 4 of D2 contain hot data and slices 8-9 of D1 and slice 6 of D2 contain cold data. Further, disks D1-D3 may be designated as hot disk drives and disks D4-D5 may be designated as cold disk drives. Based on these determinations, slice manager 116 may relocate cold slices to cold disks in order to consolidate cold data onto drives configured to be spun down in order to conserve power. For example, continuing the illustrated scenario, the data associated with cold slices 8-9 of D1 and cold slice 6 of D2 may be moved to slices 1-4 of cold disk D4 while hot slices 1-3 of D1 and hot slice 4 of D2 may be left on hot disk drives D1 and D2, respectively, without being consolidated.

However, it is appreciated that in other embodiments both hot and cold data may be consolidated onto as few disks as possible and remaining disks may be spun down in order to conserve power. For example, the data associated with hot slice 4 of D2 may be moved to slice 4 of D1. Finally, hot disks D2-D3 may then be re-designated as cold disks in order to be eligible to be spun down because they no longer contain any data.

Alternatively, hot data may be distributed across all available hot disks in order to increase performance. For example, the data associated with hot slice 3 of D1 may be moved to slice 1 of hot disk D3 so that two hot slices are located on hot disk D1, one hot slice is located on hot disk D2, and one hot slice is located on hot disk D3. Because hot disk drives D1-D3 are intended to be operated at nominal spin rates (e.g., active or idle modes) at all times, the power consumption is roughly the same at all times regardless of how hot data is distributed among them. Therefore, it may be advantageous to increase the performance of the hot disk portion of data storage array 100.

In another exemplary scenario, cold data may be determined to become hot data after it has been accessed frequently enough to satisfy the conditions for relocation to a hot disk or RG based on the prevailing policy. It may be appreciated that any access of a spun down drive may cause the drive to be spun up (incurring a latency penalty). If the drive is dormant for some pre-determined threshold of time (e.g., measured in minutes), the drive may be spin down again. Such newly hot data may be relocated back to hot disks so as not to negatively impact the power savings achieved by spinning down cold disks or reducing the spin rate. For example, assuming that data associated with cold slice 1 on cold disk D4 has been requested enough times in a given time period to satisfy the threshold set by the administrator of array 100 to be classified as hot data, slice manager 116 may relocate the data to hot slice 2 of hot disk D3 for example. The above scenarios provide a brief description of controlling prioritization of spin down features in a data storage system such that hot data is stored on hot disks not to be spun down while cold data is stored on designated cold disks to be spun down resulting in power savings of data storage array 100 as compared with conventional arrays that do not support these features. It may also be appreciated that if, after relocating the hot slices as best as possible, the remaining slices on any drives which had their speed reduced are hotter than a defined temperature threshold, the drives should be spun faster to accommodate performance needs of the hotter slices.

Figure 2:
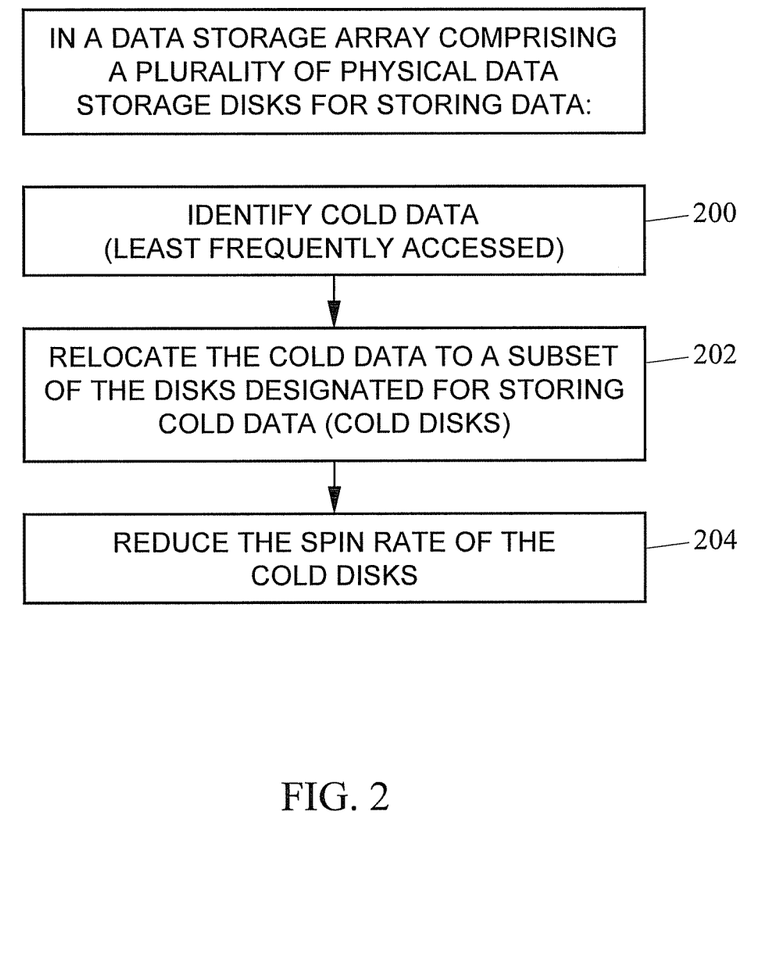
FIG. 2 is a flow chart illustrating an exemplary process for tier-based slice allocation and data relocation in a data storage array according to an embodiment of the subject matter described herein.

FIG. 2 is a flow chart illustrating exemplary steps for controlling prioritization of tiering and spin down features in a data storage system according to an embodiment of the subject matter described herein. It may be appreciated that the processes shown in FIG. 2 and described herein may be executed by a policy engine 117 in conjunction with slice manager either continuously or at intervals. For example, slice manger may monitor I/O counts for data stored in array 100 and policy engine 117 may determine whether to relocate data to different disks within the array. Because data relocation may be a slow (or otherwise resource intensive) process that could potentially negatively affect the performance of customer's application running on array 100, policy engine 117 may delay or otherwise optimize the data relocation so as to minimize these effects. For example, assuming that 3 TB of cold data is to be moved to a different drive or RG within the same storage pool and this transfer would take 6 hours to complete, policy engine 117 may decide to perform the transfer at night or in smaller pieces over several days. The process may be completely transparent to the customer.

Referring to FIG. 2, at block 200, data that is infrequently accessed may be identified. For example, according to a first method, the observed number of references may be periodically checked over a period of time and used to order the slices from most referenced (i.e., hot) to least referenced (i.e., cold). For example, a threshold may be set at 5 accesses per hour. A first piece of data, whether in the form of a file, block, slice, LU, etc., may be determined to have been accessed 1 time in the previous hour. A second piece of data may be measured to have been accessed 10 times in the previous hour. Therefore, the first data may be classified as cold data and the second data may be classified as hot data. The threshold may also include a determination of a number of accesses over combination of multiple time periods. For example, the threshold may include identifying data as hot data if it is accessed more than 5 times per hour for three consecutive hours, or for three hours (non-consecutive or consecutive) within a day (or any other longer arbitrary time period). Such thresholds may allow for hysteresis so that data is neither too quickly classified as cold data nor too quickly re-classified back as hot data. Finally, it may be appreciated that different thresholds may be applied to hot data and cold data, respectively. For example, it may be desirable to make it more difficult for data to go from cold to hot than it is to go from hot to cold.

According to a second method, the ratio of hot and cold data may be maintained in roughly the same ratio as that of hot and cold disks. For example, assuming that 70% of disks within the data storage array have been designated as hot disks and 30% have been designated as cold disks, then rather than using a threshold, the 30% of data that is the least frequently accessed may automatically be designated as cold data. This may be desirable in order to balance the usage of cold and hot disks because data may always be stored on both hot and cold disks whereas using the threshold method described above may result in 100% (or some other ratio being different from the distribution of hot and cold disks) of data being classified as either hot or cold data. As a result, for example, cold data storage may be overburdened while hot data storage may be underutilized (or vice versa). As will be described in greater detail below, however, one method for overcoming a misallocation between the amount of hot data and the capacity of designated hot disks includes changing the designation of a given disk from hot to cold (or vice versa) while leaving the data stored on the disk in order to bring the data storage system into better balance.

At block 202, the infrequently accessed data may be relocated to a subset of the physical data storage disks designated for storing infrequently accessed data. For example, a first subset of disks within the array may be designated as hot disks and a second subset of disks may be designated as cold disks. The ratio of hot and cold disks may be initially set by an administrator, such as 70% hot disks and 30% cold disks, based on an expectation of data usage. Disks may also be re-designated as hot or cold disks depending on the storage needs for each category as may be determined by the balance of hot and cold data that must be stored.

It may be appreciated that because hot disks may always be operated at their nominal spin rates or active/idle state while cold disks may always be operated at their minimum spin rates or standby/sleep states, the subject matter described herein may optimize the energy consumption of a data storage array having multiple disks by determining where to store particular data based on its usage or access patterns. This contrasts with conventional determinations regarding whether to spin up or spin down a single hard drive containing a mixture of hot and cold data in order to save energy for several reasons. First, because a data storage array contains multiple hard drives which may be selectively maintained in either spun up or spun down modes, data may also be selectively spun up or spun down. This is different from a single disk scenario in which all data must either be spun up or spun down together. This further contrasts with algorithms for spinning up or down individual disks within a data storage array. In such a scenario, each disk within the array may store a mixture of hot and cold data in different ratio and access patterns. Therefore, each disk within the array may be spun up or down at different times. While such a system may optimize the energy of each disk given the data stored on it and its corresponding access pattern, even greater efficiencies may be gained by identifying hold and cold data across the plurality of disks and moving the data among the disks within the array as is disclosed herein. By consolidating or aggregating cold data together and hot data together, a subset of the array (i.e., the cold disks) may be spun down to lower levels and/or for longer periods of time than would be possible in a conventional data storage array where power management procedures are implemented at the individual disk level.

In the reverse direction, cold data may be relocated to a hot disk upon being reclassified as hot data when the cold data has been accessed enough times during a given time period as described above. In one embodiment, it may not be desirable to reclassify cold data as hot data, and therefore to relocate the data, simply based upon a first I/O request for the cold data. As mentioned above, the effect of spikes of I/O requests for particular data may be minimized because the temperature of the data may not rise significantly or immediately as a result of the spikes. For example, as cold data gets hotter it may eventually have more references than data stored on the hot disks. At that time the formerly cold data may be moved to a hot disk. It may be appreciated that in some cases, it may be necessary to move data from hot disks to cold disks in order to make room on the hot disks (e.g., swap two slices).

According to another aspect, it may be appreciated that in a tiered data storage array, resource groups may provide constraints on slice manager's ability to relocate data. For example, as mentioned above, disks are typically grouped into RGs and all disks within each RG must be spun down or spun up together. Moreover, multiple RGs may belong to a resource pool and data storage array 100 may include multiple resource pools. In one possible embodiment, array 100 may not allow for relocating data from one resource pool to a different resource pool and therefore may relocate data only within the same resource pool, when appropriate, based on the spin down and data relocation policy implemented. In other embodiments, inter-resource pool data transfer may be possible and provide additional possibilities for balancing power and performance across data array 100. It may be appreciated that the subject matter described herein may take advantage of inner and outer track speed differences or resequence data so it can be relocated quickly at a later time. This process may be seamless to the customer and may include automatic I/O queuing, data mirroring, etc. in order to ensure high reliability during the transfer operation.

According to another aspect, a preview feature may allow for users of array 100 to view and plan for data relocations which would result from application of the policy described herein before the relocation takes place. For example, policy engine 117 may determine that a slice within a given customer's LU is now cold and should be moved to a cold disk in order to conserve power. Yet before the operation takes place, the customer or an administrator may utilize an interface to, in effect, query policy engine 117 as to what operations would be performed if the spin down prioritization and data relocation algorithm/policy were to be run on the data currently stored in array 100. Policy engine 117 may provide to the user, in response to the query, a detailed listing of which data are to be moved and an estimate of how much time would be required to complete these operations. The user may then decide to agree with policy engine's 117 recommendations/plan or may override or delay them to better suit their needs.

According to another aspect, the plurality of attributes, parameters, or settings associated with controlling the performance and/or power consumption of data storage array 100 may be individually and manually altered by an administrator or may be collected into one or more shortcuts. These shortcuts may represent different balances between low power consumption and high performance characteristics of array 100. For example, a first, high-performance, high-power consumption shortcut may include a policy or algorithm that continuously rebalances all data across all drives for maximum performance and does not spin down or otherwise reduce the spin rate of drives. One method for implementing this may include setting a temperature threshold value to 0 degrees (assuming range 0-100 degrees) so that all data is classified as hot data. Alternatively, the administrator may provide a preference of maximum performance or maximize power savings, or anything in between. Additionally, the shortcut may designate all drives as hot drives and therefore prevent them from spinning down. In a different example, a second, low-performance, low-power consumption shortcut may include a policy that aggregates hot and cold data onto as few drives as possible, thereby maximizing empty space, in order to spin down as many drives as possible. This may be implemented by setting the temperature threshold separating hot from cold data to 70 degrees so that most data is classified as cold data. Likewise, the shortcut may designate the minimum number of drives as hot drives and therefore maximize the number of drives that may be spun down. It is appreciated that any number of shortcuts may be created corresponding to different combinations of settings or attributes corresponding to a variety of usage scenarios. In order to simplify management of these shortcuts, an interface such as a slider (e.g., line and selector) may be used for allowing an administrator to select where on a continuum between performance and low power consumption the array 100 should be balanced. Each location along the one dimensional slider may correspond to a shortcut as described above. The slider interface is not intended to be limiting, and additional shortcut interfaces such as two dimensional plots may also be used without departing from the scope of the subject matter described herein.

At block 204, the spin rate of the designated subset of the physical data storage disks may be reduced. As mentioned above, reducing the spin rate of cold disks may also include dynamically reducing the spin rate of cold disks. This may be contrasted with the above-described embodiments where only two spin rates or modes are assumed (e.g., active and standby). Instead, there may be a continuum of spin rates that may be used. For example, the spin rate of cold disks in the active state may the same as the spin rate of hot disks in their active state (e.g., the nominal rate). Because cold disks must be spun up in order to write data to them as a result of a cold data relocation procedure, there may be various methods for determining how to slow the spin rate of cold disks after the initial write procedure. For example, the cold disk may immediately return to its minimum spin rate (e.g., zero or off) or may slowly reduce its spin rate as time passes and the cold data remains unaccessed (i.e., data remains cold or gets colder). For a disk having a 7,200 rpm nominal rate, the disk may be configured to reduce its spin rate to 5,000 rpm after 5 minutes without further data access requests, and then again to 1,000 rpm after 1 hour without further data access requests, and so on. This may be accomplished, for example, by lowering the voltage to the disk drive or sending instructions to the disk controller to lower the spin rate of the drive.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for controlling prioritization of tiering and spin down features in a data storage system, the method comprising:
in a data storage array comprising a plurality of physical data storage disks for storing data:
logically dividing storage collectively provided by the physical data storage disks into logical units spanning plural different physical data storage disks and dividing the logical units into slices;
identifying data that is infrequently accessed, wherein identifying data that is infrequently accessed includes identifying slices on different physical data storage disks containing infrequently accessed data;
relocating the infrequently accessed data to a subset of the physical data storage disks designated for storing infrequently accessed data, wherein relocating the infrequently accessed data includes consolidating the identified slices from the different physical data storage disks to the designated subset of physical data storage disks; and
after consolidating the identified slices to the designated subset of physical data storage disks, reducing the spin rate of the designated subset of physical data storage disks.

2. The method of claim 1 wherein identifying the data that is infrequently accessed includes comparing a rate of access against an administrator-defined access rate threshold value.

3. The method of claim 1 wherein identifying the data that is infrequently accessed includes identifying a least frequently accessed portion of the data that is in the same ratio as the ratio between the subset of disks designated for storing infrequently accessed data and the remaining disks in the array, and identifying that data as the data that is infrequently accessed.

4. The method of claim 1 wherein reducing the spin rate of the subset of the disks includes spinning down the subset of the disks into a low-power state.

5. The method of claim 4 wherein the low-power state includes one of standby, sleep, and off states.

6. The method of claim 1 wherein reducing the spin rate of the subset of the disks includes reducing the spin rate of the disks to a spin rate less than one of a maximum spin rate and a nominal spin rate of the subset of the disks.

7. The method of claim 1 comprising designating the data that is infrequently accessed as being eligible to be stored on a disk that is subject to spin down.

8. The method of claim 1 comprising designating the data other than the data that is infrequently accessed as being ineligible to be stored on a disk that is subject to spin down.

9. The method of claim 1 wherein the data includes at least one of a file, block, slice, and logical unit (LU).

10. The method of claim 1 comprising determining that the infrequently accessed data has been frequently accessed and, in response, relocating the frequently accessed data from the subset of the disks designated for storing infrequently accessed data to the remaining subset of the disks designated for storing frequently accessed data.

11. The method of claim 1 comprising consolidating frequently accessed data onto a minimum number of disks and designating all other disks for storing infrequently accessed data.

12. A data storage array for prioritization of tiering and spin down features, the data storage array comprising:
a plurality of physical data storage disk drives for storing data, wherein storage collectively provided by the physical data storage disks is divided into logical units spanning plural different physical data storage disks and dividing the logical units into slices; and
a policy engine for identifying data that is infrequently accessed, relocating the infrequently accessed data to a subset of the physical data storage disks designated for storing infrequently accessed data, wherein relocating the infrequently accessed data includes consolidating the identified slices from the different physical data storage disks to the designated subset of physical data storage disks, and, after consolidating the identified slices to the designated subset of physical data storage disks, reducing the spin rate of the designated subset of physical data storage disks.

13. The data storage array of claim 12 wherein the policy engine is configured to compare a rate of access against an administrator-defined access rate threshold value.

14. The data storage array of claim 12 wherein the policy engine is configured to identify a least frequently accessed portion of the data, in the same ratio as the ratio between the subset of disks designated for storing infrequently accessed data and the remaining disks in the array, and identifying that data as the data that is infrequently accessed.

15. The data storage array of claim 12 wherein the policy engine is configured to spin down the subset of the disks into a low-power state.

16. The data storage array of claim 15 wherein the low-power state includes one of standby, sleep, and off states.

17. The data storage array of claim 12 wherein the policy engine is configured to reduce the spin rate of the disks to a spin rate less than one of a maximum spin rate and a nominal spin rate of the subset of the disks.

18. The data storage array of claim 12 wherein the policy engine is configured to designate the data that is infrequently accessed as being eligible to be stored on a disk that is subject to spin down.

19. The data storage array of claim 12 wherein the policy engine is configured to designate the data other than the data that is infrequently accessed as being ineligible to be stored on a disk that is subject to spin down.

20. The data storage array of claim 12 wherein the data includes at least one of a file, block, slice, and logical unit (LU).

21. The data storage array of claim 12 wherein the policy engine is configured to determine that the infrequently accessed data has been frequently accessed and, in response, relocate the frequently accessed data from the subset of the disks designated for storing infrequently accessed data to the remaining subset of the disks designated for storing frequently accessed data.

22. The data storage array of claim 12 wherein the policy engine is configured to consolidate frequently accessed data onto a minimum number of disks and designating all other disks for storing infrequently accessed data.

23. A non-transitory computer readable medium having stored thereon computer executable instructions that when executed by the processor of a computer perform steps comprising:
in a data storage array comprising a plurality of physical data storage disks for storing data:
logically dividing storage collectively provided by the physical data storage disks into logical units spanning plural different physical data storage disks and dividing the logical units into slices;
identifying data that is infrequently accessed, wherein identifying data that is infrequently accessed includes identifying slices on different physical data storage disks containing infrequently accessed data;

relocating the infrequently accessed data to a subset of the physical data storage disks designated for storing infrequently accessed data, wherein relocating the infrequently accessed data includes consolidating the identified slices from the different physical data storage disks to the designated subset of physical data storage disks; and after consolidating the identified slices to the designated subset of physical data storage disks, reducing the spin rate of the designated subset of physical data storage disks.

\* \* \* \* \*